United States Patent [19]

Dornier

[11] Patent Number: 4,629,240
[45] Date of Patent: Dec. 16, 1986

[54] VEHICLE STABILIZING MEANS

[76] Inventor: Claude M. Dornier, Rte. 3, Box 240, Prairieville, La. 70769

[21] Appl. No.: 746,743

[22] Filed: Jun. 20, 1985

[51] Int. Cl.⁴ .............................................. B62D 35/00
[52] U.S. Cl. ..................................... 296/1 S; 180/903
[58] Field of Search ......................... 296/1 S; 180/903; 188/270

[56] References Cited

U.S. PATENT DOCUMENTS

| | | | |
|---|---|---|---|
| 3,455,594 | 7/1969 | Hall et al. | 296/1 S |
| 3,623,745 | 11/1971 | Taylor | 296/1 S |
| 3,791,468 | 2/1974 | Bryan, Jr. | 296/1 S |

Primary Examiner—Robert R. Song
Attorney, Agent, or Firm—William David Kiesel

[57] ABSTRACT

An improved horizontal air foil for use with racing cars or similar vehicles wherein the position of a pivotable rear flap is controlled by driver actuation of the braking system connected to a unique hydraulic linkage assembly.

2 Claims, 5 Drawing Figures

VEHICLE STABILIZING MEANS

BACKGROUND OF THE INVENTION

1. Field of the Invention

This invention relates in general to racing cars and more particularly to air foils used with racing cars and the means to control their operation.

2 Prior Art

In the field of high speed vehicles and particularly racing cars, there are certain inherent stability problems that result directly from the movement of the car through the air at high speeds. It is well known, for example, that air passing between the wheels and the body of the vehicle is accelerated due to the venturi affect caused by the wheelbody combination. This high speed flow of air over the body section generates it since the body section of the vehicle acts as an air foil.

These lifting forces act throughout the complete surface of the vehicle and generally affect the vertical component or weight of the vehicle in a longitudinal path. Hence, depending upon the center of gravity of the vehicle and the differences in lift coefficient throughout the length of the vehicle, there is a tendency for the vehicle to become longitudinally unstable at high speeds.

In an effort to correct the flying tendency of the modern racing car, various techniques have been suggested and used in an effort to increase the traction of the car on the race track during high speed operation. For example, in the so-called McClaren racing car of 1971, a fixed, horizontal air foil was located about the rear wheels for generating a force in a downward direction so as to increase the vertical component on the rear wheels in an effort to increase traction during high speed operation. This concept has been widely copied and utilized as a means of increasing vertical stability during high speed operation.

There are today many modifications of the McClaren type air foil and they include a horizontal air foil in the front of the car as well as in the rear of the car, thereby to increase the vertical component at both the front and rear wheels. In addition, other modifications include the use of four separate air foils located at each wheel to provide increased flexibility in obtaining an increased vertical component of weight at each of the four wheels.

Examples of some of the specific modifications can be seen in U.S. Phillippe Pat. No. 3,768,582 issued Oct. 30, 1973 and entitled "Stabilizing Device", U.S. Backowski Pat. No. 3,790,206 issued Feb. 5, 1974 and entitled "Vehicle Stabilizing Means and Methods," U.S. Powell Pat. No. 3,894,764 and entitled "Stabilizing Wing for a Racing Vehicle," and U.S. Wheeler Pat. No. 4,455,045 and entitled "Means for Maintaining Attached Flow of a Flowing Medium."

While each of these prior art designs do achieve increased stability to the racing vehicle, it is accomplished in many cases by complicated body design, which is difficult and expensive to construct or not easily adaptable to modern racing body designs.

In addition, these prior art designs do not allow flexible independent control by the driver. As a result there are many instances during a race that the effects achieved can be detrimental in achieving the performance desired by the driver.

SUMMARY OF THE INVENTION

Therefore, it is an object of this invention to provide an improved horizontal air foil for use in a racing vehicle, the operation of which can be controlled by the driver.

Another object of this invention is to provide a mechanically simple means for controlling the position of a pivotable flap located on the rear of a horizontal air foil.

These and other advantages and objects of this invention shall become apparent from the ensuing descriptions of the invention.

Accordingly, an air foil assembly for use with a racing vehicle positioned and attached to the rear of the vehicle, and having a rear flap pivotable from the horizontal by a positioning assembly is provided comprising a hydraulic cylinder fixedly attached to the vehicle chassis or air foil support structure and operatively connected to the vehicle braking system to provide the hydraulic pressure needed and having the piston rod of the hydraulic cylinder attached at its end to a linking assembly operatively attached to the flap in a manner to cause the flap to pivot upwardly upon the extension of the piston.

BRIEF DESCRITPION OF THE DRAWINGS

PREFERRED EMBODIMENTS OF THE INVENTION

Figure 1:
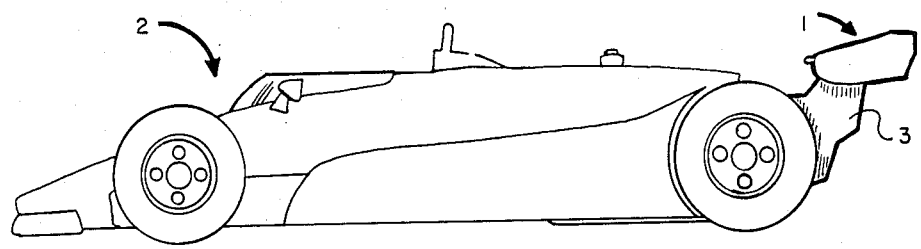
FIG. 1 is a side view of a racing vehicle employing the air foil of this invention.

A typical racing vehicle configuration is illustrated in FIG. 1 which employs an air foil assembly denoted generally by the numeral 1, which is attached to the rear of racing vehicle 2 by support struts 3.

Figure 2:
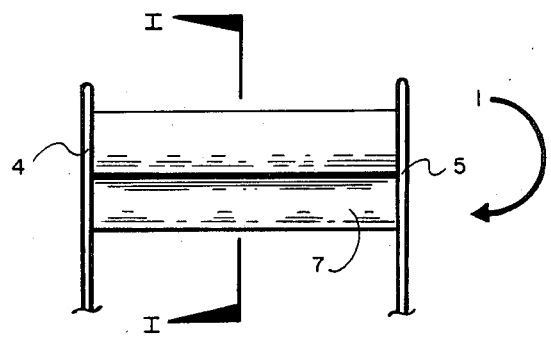
FIG. 2 is a top view of the air foil shown in FIG. 1.
Figures 3, 4:
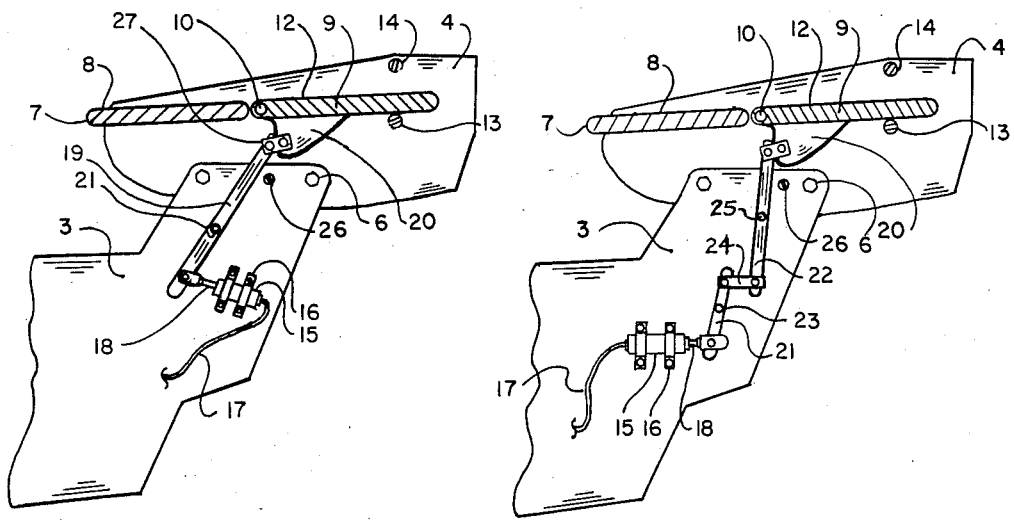
FIG. 3 is a partial cutaway side view of the racing vehicle air foil taken along lines I—I of FIG. 2 illustrating a preferred embodiment of the linking assembly.
FIG. 4 is a partial cutaway side view similar to FIG. 3 of the racing vehicle air foil illustrating an alternate preferred embodiment of a linking assembly used to control the flaps.
Figure 5:
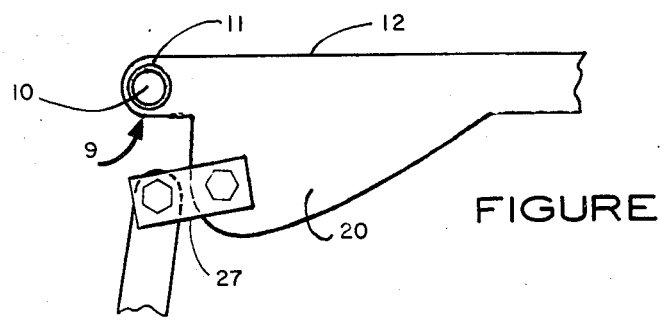
FIG. 5 is an enlarged view of the connecting links between the hydraulic cylinder and air foil as seen in FIG. 3.

Turning now to FIGS. 2-4 preferred embodiments of the air foil assembly 1 are shown. Assembly 1 comprises fixed vertical panels 4 and 5 which are attached to struts 3 by bolts 6 or other conventional means. Extending between and attached to panels 4 and 5 is a forwardly fixed positioned horizontal foil 7 having a relative flat upper surface 8. Directly behind foil 7 is rear foil 9 which pivots about rod 10 that extends through foil opening 11. In its lowered position rear foil 9 has a relatively flat upper surface 12 which is parallel to and forms a plane with surface 8. In a preferred embodiment lower stop means 13 protrudes outward from strut 3 to prevent foil 9 from pivoting to any lower position. In another preferred embodiment, upper stop means 14 protrudes outward from strut 3 to prevent foil 10 from pivoting upward to an angle greater than desired, thus acting as a safety means too prevent to quick of braking that might result in skidding or fish tailing of the racing vehicle.

To actuate rear foil 9, a hydraulic cylinder 15 is attached to one of the struts 3 by clamps 16 or similar means and is hydraulically connected to the braking system (not shown) of the racing vehicle 2 by hydraulic hose 17. As seen in FIG. 3, cylinder piston rod 18 is pivotally attached to the lower end of linking arm member 19 which extends upward to contact bracket member 20 of rear foil 9. Arm member 19 is pivotally attached to strut 3 by pin 21 preferably toward the lower end of arm member 19 to require as short a piston rod stroke as possible.

In another alternate preferred embodiment linking member 27 is pivotly attached at its opposite ends to member 19 and bracket member 20 to provide a positive attachment that insures proper movement of foil 9.

In an alternate embodiment, as illustrated in FIG. 4, additional leverage can be obtained by using multiple linking arm members 21 and 22. In this embodiment piston rod 18 is pivotally attached to the lower end of arm member 21 which is pivotally attached to strut 3 by pin 23. Upper end of arm member 21 is then operatively attached to the lower end of arm member 22 by connecting member 24. Again it is preferred that arm member 22 is pivotally attached by pin 25 toward its lower end as shown.

In a preferred embodiment stop means 26 protrudes from strut 3 to prevent arm member 22 from pivoting to far right and losing contact with bracket member 20 and to prevent foil 10 from pivoting upward to an angle greater than desired. In another preferred embodiment, the contacting surfaces of bracket member 20 and arm member 22 are convexly shaped to reduce any possibility of binding during the raising or lowering of air foil 9.

In operation, the driver of the racing vehicle will begin braking upon entering a curve. When this occurs, hydraulic pressure is applied to hydraulic cylinder 15 causing piston rod 18 to extend outward. This action then forces arm member 19 to press against bracket member 20 causing rear flap 9 to rise. This creates additional drag to assist in slowing the vehicle while also causing additional downward force at the rear tire area to help prevent skidding. When the driver stops braking piston rod 18 is retracted and the wind forces cause rear flap 9 to return to its lowered position, thus causing less wind resistance on a straight-run.

There are of course other embodiments such as the use of a solenoid in those cars having 12 volt systems to activate a magnetic motor, not specifically illustrated but which become obvious from the description of the invention and which are meant to be included within the scope of the invention as defined by the following claims.

What I claim:

1. An air foil assembly for use with a racing vehicle positioned and attached to the rear of said racing vehicle by a support structure, comprising:
    (a) a flap pivotable from a horizontal plane by a positioning assembly, said flap extending between parallel vertical panels and a stop means protruding from at least one of said panels at a pre-determined position above said flap; and
    (b) a hydraulic cylinder assembly having a hydraulic cylinder fixedly attached to said support structure and operatively connected to the vehicle braking system to provide hydraulic pressure to said hydraulic cylinder, said hydraulic cylinder having its piston rod pivotally attached to a linking assembly connected to said support structure and operatively contacting said flap to cause said flap to pivot upward or downward upon movement of said piston rod.

2. An air foil assembly according to claim 1 wherein a second stop means protrudes from at least one of said panels at a pre-determined position below said flap.

* * * * *